March 15, 1955 K. A. ARVIDSSON 2,704,160
LOG LOADING DEVICE FOR TRUCKS
Filed Nov. 15, 1951 5 Sheets-Sheet 1

INVENTOR:
K.A. ARVIDSSON
ATTORNEYS:
Moore & Hall

March 15, 1955 K. A. ARVIDSSON 2,704,160
LOG LOADING DEVICE FOR TRUCKS
Filed Nov. 15, 1951 5 Sheets-Sheet 2

INVENTOR:
K.A. ARVIDSSON
ATTORNEYS:
Moore & Hall

March 15, 1955 K. A. ARVIDSSON 2,704,160
LOG LOADING DEVICE FOR TRUCKS
Filed Nov. 15, 1951 5 Sheets-Sheet 3

INVENTOR:
K.A. ARVIDSSON
ATTORNEYS:
Moore & Hall

March 15, 1955  K. A. ARVIDSSON  2,704,160
LOG LOADING DEVICE FOR TRUCKS
Filed Nov. 15, 1951  5 Sheets-Sheet 4
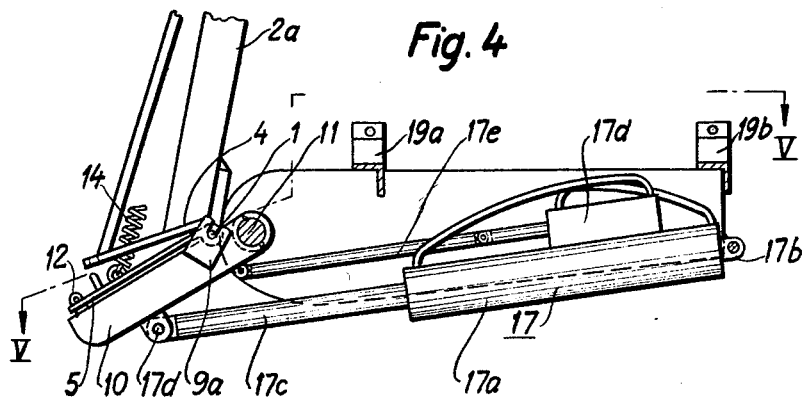
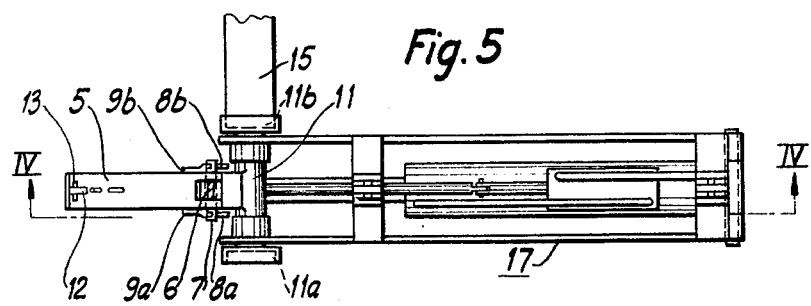
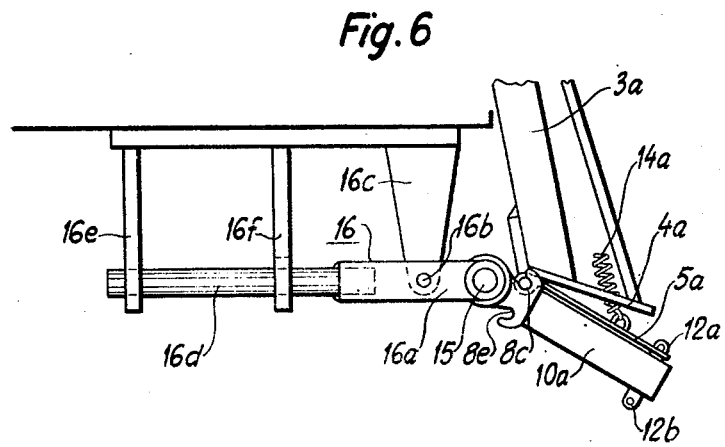
INVENTORS:
K.A. ARVIDSSON
ATTORNEYS:

United States Patent Office 2,704,160
Patented Mar. 15, 1955

2,704,160

LOG LOADING DEVICE FOR TRUCKS

Karl Arne Arvidsson, Norra Stromfors, Sweden, assignor to Johan Elis Forslund, Skelleftea, Sweden Application November 15, 1951, Serial No. 256,425

Claims priority, application Sweden December 5, 1950

9 Claims. (Cl. 214—77)

The present invention relates to a loading device in load carrying vehicles, such as trucks, and is particularly adapted for loading lumber and other cylindrical objects. The invention is concerned with such devices comprising at least a load arm and an auxiliary arm driven thereby the load arm being swingable in a vertical plane, transverse to the direction of travel of the vehicle, between a swung-down picking-up position and a swung-up delivery position under the action of a common operating means mounted detachably on the vehicle adjacent one end thereof, preferably the rear end, in such a way that it may operate alternately on one side or the other of the vehicle.

One object of the invention is to simplify such known devices and to render possible the application of operating means of hydraulic type having a reciprocating piston. The present invention is not concerned with such hydraulic means which are per se well known in the art.

The invention provides that the operating means has a driving pin rotatable in reciprocation and intended to fall in the longitudinal direction of the vehicle and to be positively coupled to the load arm and carrying at its both ends engagement means. One form of coupling, as shown in the drawing, may be a square or non-circular hole in combination with a mating stud providing a rigid coupling in detachable engagement in alternation with the one end of a rotatable drive shaft extending along the vehicle and carrying the auxiliary arm. In this way the operating means may be brought to operate in alternation with one or the other side on the drive shaft.

According to an embodiment of the invention a drive arm is fixed to the rotatable driving pin and carries projections and/or recesses to which the load arm is coupled. In respect of the auxiliary arm a drive arm may be fixed to the drive shaft and carry projections and/or recesses to which the auxiliary arm is coupled.

Another feature of the invention is the provision of a foot plate rotatably connected with the load arm and/or the auxiliary arm and mounted on the projections and/or recesses of the corresponding drive arm.

The invention will be more closely described with reference to the accompanying drawings further features of the invention being then set forth.

Fig. 2 is a rear view of the device taking up its picking-up position whereas

Fig. 4 is an enlarged detail partially in section on the line IV—IV in Fig. 5 whereas Fig. 5 is a plan view partially in section on line V—V in Fig. 4.

Fig. 6 is an enlarged detail as viewed from line VI—VI in Fig. 1.

Figure 1:
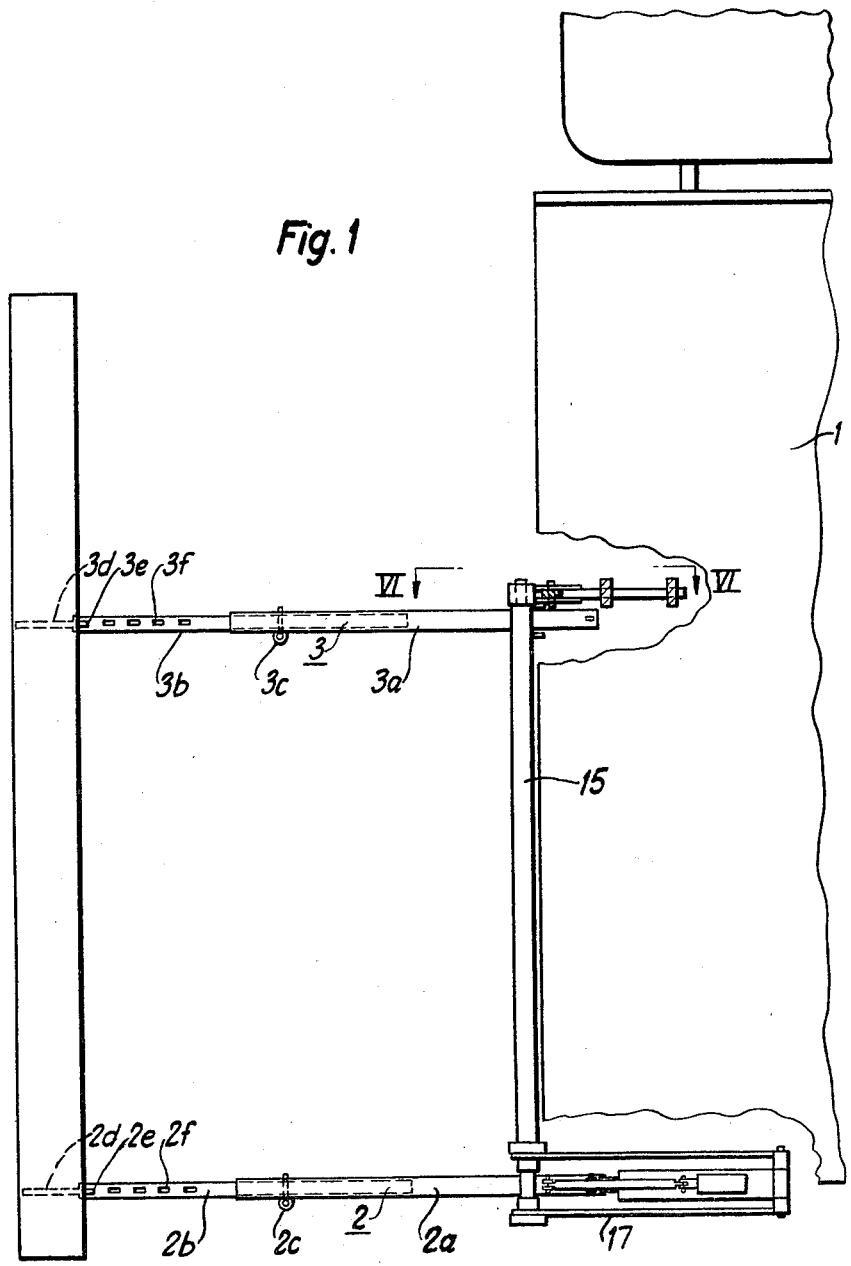
Fig. 1 is a plan view of a general arrangement provided on a truck the platform of which is partially broken away.

In the shown example the loading device is mounted on the left hand side of the platform 1 of a truck. The main parts of the device are a load arm generally designated 2 and an auxiliary arm generally designated 3 each of which consists of a pipe 2a and 3a respectively in which a thinner pipe, 2b and 3b respectively, is telescopically displaceable and retainable in a selected position by means of a pin 2c and 3c respectively. At their free ends the arms are provided with gripping jaws 2d and 3d respectively and abutment pins 2e and 3e respectively which may be inserted into different holes 2f and 3f respectively in the corresponding arms.

Figure 2:
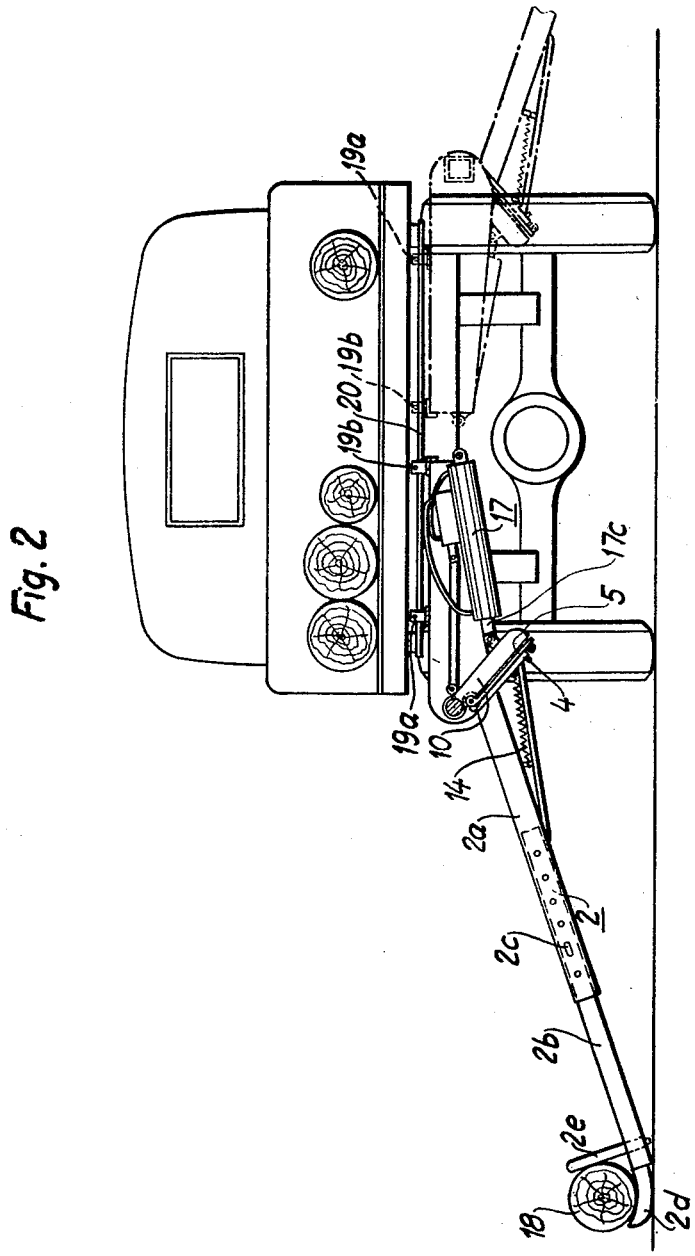
Figure 3:
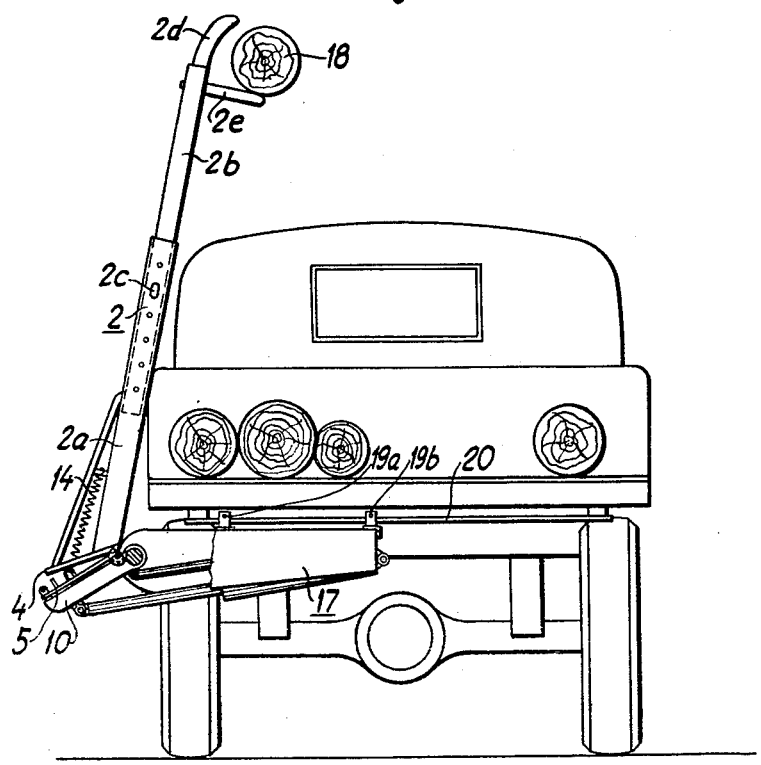
Fig. 3 illustrates in a similar manner the device in its delivery position.
Figure 7:
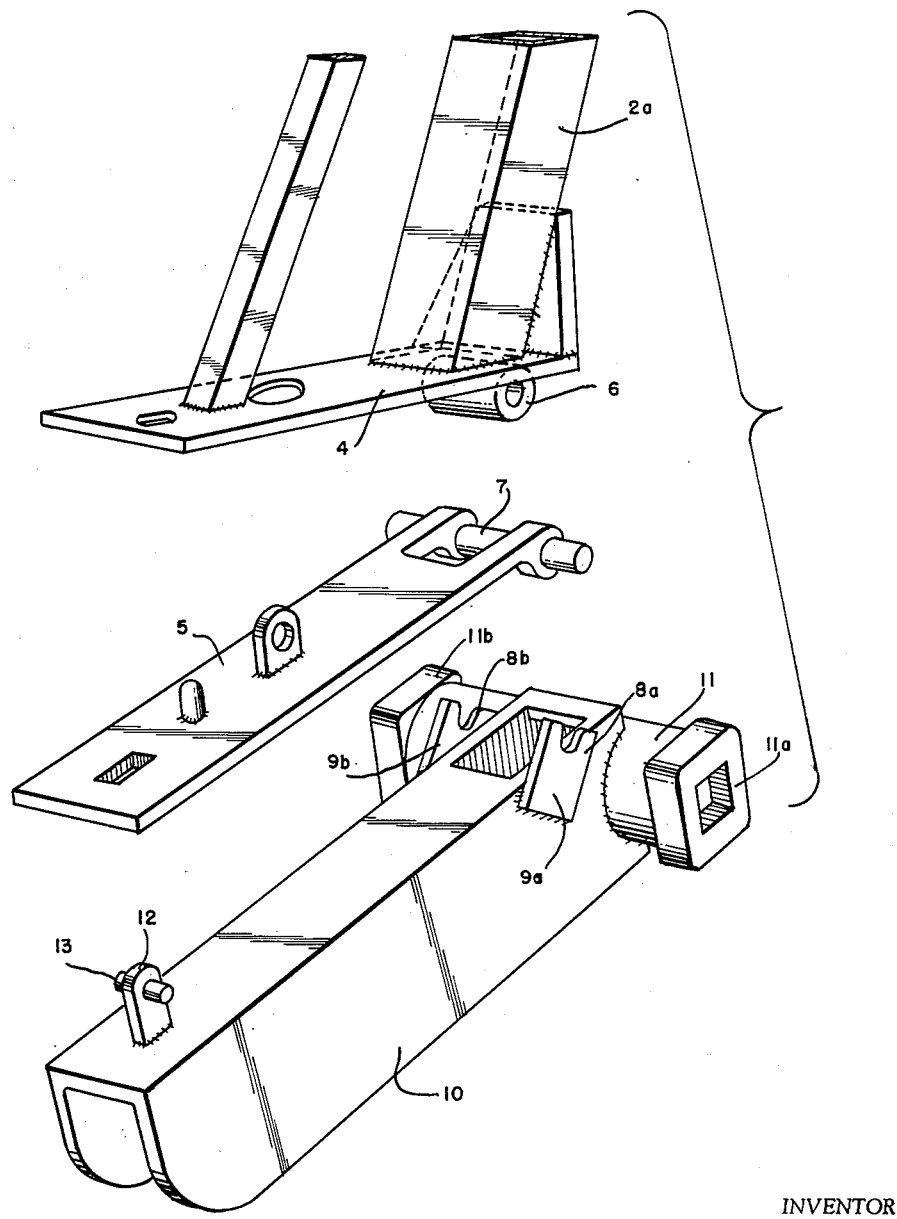
Fig. 7 is an exploded detail view of the base of the driving arm.

With particular reference to Figs. 4 and 5 the pipe portion 2a of the arm 2 is provided with an abutment plate 4 rigidly mounted thereon and which, in the raising movement of the load arm, bears against a foot plate 5, compare also Fig. 2. In the one direction of swinging of the arm 2, in this case in the anticlockwise direction, the abutment plate 4 limits the movement of the load arm 2 in relation to the foot plate 5. For this purpose the plate 4 is provided with a projection 6, provided with a hole through which a pin 7 is passed, said pin being rotatably journalled in two recesses 8a and 8b. These are provided in plates 9a and 9b respectively firmly welded to an operating arm 10 being in turn welded to a rotatable driving pin 11 included in the operating means generally designated 17. The pin 11 carries at its both ends engagement means each adapted for a detachable but rigid coupling with the drive shaft 15. In this case said engagement means consist of non-circular, preferably square, holes in fittings 11a and 11b respectively adapted to fit a correspondingly shaped terminal pin of the shaft 15. The driving arm 10 is further provided with projections 12 engaging a corresponding aperture in the foot plate 5. The latter is locked to the driving arm 10 by inserting a pin 13 into the projection 12. Between the foot plate 5 and the pipe portion 2a of the load arm there is a helical tension spring 14 which biases the arm 2 anticlockwise so that its abutment plate 4 is brought to bear against the foot plate 5. Also the pipe portion 3a of the auxiliary arm is provided with a corresponding abutment plate 4a and a corresponding driving arm 10a having a projection 12a and recesses 8c and a foot plate 5a. A tension spring 14a serves a similar purpose as the spring 14 illustrated in Fig. 4. The operating arm 10a is, however, rigidly secured to the drive shaft 15 the opposite end of which is adapted, as above described, to be coupled with the rotary pin 11 of the operating means 17. Adjacent the driving arm 10a acting on the pipe 3a of the auxiliary arm the drive shaft is journalled in the outer end of the one arm 16a of a double armed lever 16 mounted on a pin 16b in a fixture 16c secured to the truck whereas the second arm 16d of the lever is in the form of a rod and inserted into two guides connected to the truck and illustrated as holes provided in fixtures 16e and 16f directed downwards from the truck platform.

The details shown in Fig. 6 differ also in another respect from those shown in Fig. 4 in that the driving arm 10a belonging to the auxiliary arm 3 carries a projection and recesses not only on its one side but also on its opposite side as indicated by the characters 12b and 8e. These are intended to be used in alternation with the projection and recesses of the first mentioned side when the load and auxiliary arms are to be mounted on the opposite side of the vehicle.

The operating means 17, which is not per se the object of the present application but is part of the combination, may consist of a cylinder 17a pivoted at 17b on the vehicle and in which a hydraulically operated piston is reciprocable so that the corresponding piston rod 17c is driven to and fro. The piston rod 17c is pivoted at 17d on the driving arm 10. A slide device 17d is influenced by the position of the driving arm 10 by means of a link 17e according to the drawing. Pressure fluid is supplied to the operating means 17 in a manner not indicated on the drawing, for instance, from a hydraulic pump driven by the truck engine.

When, for instance, a piece of lumber 18 is to be lifted from the ground according to Fig. 2 the operating means is shifted so that the arms 2 and 3 take up the positions shown in Fig. 2 the operating means 17 then retracting its piston rod 17c so far that the foot plates 5, 5a tend to be drawn away from the abutment plates 4, 4a and the tension in the springs 14, 14a brings the jaws 2d, 3d to bear against the ground. Then the operating means 17 is brought to exert pressure by means of the piston rod 17c against the driving arm 10 so that this is rotated in a clockwise direction as viewed in Fig. 4 and brings the drive shaft 15 to participate in the rotation so that also the driving arm 10a is rotated in the same direction, i. e. anticlockwise as viewed in Fig. 6. The arms 2 and 3 are in this way swung up to their delivery positions and the lumber 18 rolls down onto the platform of the truck. In practice the platform is, of course, provided with the usual uprights to prevent the logs from rolling off the truck, said uprights being, however, omitted on the drawing for the sake of simplicity.

If the loading device is to be mounted on the right hand side instead of on its left hand side one proceeds as follows.

The pin 13 is withdrawn and the foot plate 5 is raised and unhooked together with the arm 2 from the recesses 8a and 8b. The operating means 17, held by means of clamps 19a and 19b to a bar 20 or the like extending underneath the platform, is detached and swung to the position indicated in Fig. 2 with dashed and dotted lines, the clamps 19a and 19b being reversed according to the figure. In the removal also the part 11b is detached from the drive shaft 15 and, in the new position, it will be the part 11a instead which is turned forwards. The auxiliary arm 3 with the foot plate 5a is detached from the operating arm 10a and the stud 16b is removed and the lever 16 drawn out from the guides 16e and 16f. Then the drive shaft 15 with the lever 16 appended thereto and the driving arm 10a are moved over to the opposite side of the truck and the lever 16 inserted in the opposite direction into corresponding guides (not shown) on the opposite side of the platform. The rear end of the shaft is brought into engagement with the part 11a. The driving arm 10a is then coupled by means of the recesses 8e and the projection 12b of the opposite side to the foot plate 5a which now, together with the corresponding arm 3a, will be operating on the opposite side of the platform. The arm 2 is mounted in similar manner on the driving arm 10 now mounted on and extending from the opposite side of the truck.

I claim:

1. In combination in a loading device for a vehicle, a main loading arm, an auxiliary loading arm, each said arm being rotatably mounted for movement in a substantially vertical plane, operating means for rotating said arms, comprising a driving pin rotatably mounted for reversible movement, a first driving arm connected to said driving pin, said first driving arm having mounting means for removably coupling said first driving arm to said main load arm, said driving pin having shaft engagement means at both ends, a second driving arm coupled to said auxiliary loading arm a shaft removably connected to one of said ends of said driving pin and to said second driving arm whereby said loading device is readily mountable on either side of a vehicle, and said arms can be rotated by said operating means to load a vehicle, a foot plate connected to one of said driving arms, an abutment means fixed on one of said loading arms and selectively bearing against said foot plate whereby to restrict the movement of said loading arms in relation to said foot plate, and a resilient biasing member mounted between said foot plate and one of said loading arms to bias the latter in a direction such that the abutment means tends to bear against said foot plate.

2. The combination set forth in claim 1, said second driving arm having said mounting means on two opposite sides thereof whereby said device may be operated from either side of a vehicle.

3. In combination in a loading device for vehicles, an actuating device coupled to said vehicle and having a reciprocable arm, an elongated driving arm connected adjacent one of its ends to said reciprocable arm, an elongated foot plate removably fastened to and substantially co-extensive with said driving arm, a lifting arm pivotally coupled to said foot plate and to said driving arm adjacent the other end of said elongated driving arm, said lifting arm including an integral abutment plate adjacent said point of pivotal coupling which abutment plate selectively bears against said foot plate to limit rotation of said lifting arm with respect to said foot plate, and spring bias means between said foot plate and said lifting arm for urging said abutment plate into contact with said foot plate.

4. The combination of claim 3 in which said driving arm includes an integral driving pin adjacent said point of pivotal coupling, an auxiliary load arm rotatably coupled to said vehicle and substantially parallel to said lifting arm, and rotatable shaft means removably coupled to said driving pin and connected to said auxiliary arm for causing said auxiliary arm to follow movements of said lifting arm.

5. A loading device for vehicles comprising an elongate driving arm rotatably coupled adjacent one of its ends to said vehicle and pivotably coupled adjacent its other end to an actuating mechanism, said driving arm including integral mounting means adjacent said point of rotatable coupling, an elongated lifting arm pivotally and removably coupled to said driving arm at said mounting means, said lifting arm including integral abutment means adjacent said driving arm for limiting rotation in one angular direction only with respect to said driving arm, and resilient bias means between said lifting arm and said driving arm for urging said abutment means toward said driving arm.

6. The device of claim 5 in which said driving arm includes an elongated foot plate member substantially co-extensive with said elongated driving arm and removably fastened to said driving arm at each of its ends, said foot plate member being interposed between said abutment means and said driving arm, said resilient bias means comprising an elongated spring member fastened at one of its ends to said foot plate member.

7. The device of claim 6 in which said foot plate member has rod means at one of its ends, said lifting arm being pivotally coupled to said rod means, and said rod means being in turn removably coupled to said mounting means on said driving arm.

8. The device of claim 3 in which said lifting arm is swingable in a vertical plane, said driving arm including a rotatable driving pin adjacent the point of rotatable coupling of said driving arm to said vehicle, an auxiliary load arm substantially parallel to said lifting arm and rotatably coupled to said vehicle, and rotatable shaft means removably but positively coupled to said driving pin and extending longitudinally between said lifting arm and said auxiliary load arm and at substantially right angles to said vertical plane, said shaft means being coupled to said auxiliary load arm adjacent its point of rotatable coupling to said vehicle, whereby said auxiliary arm follows the movements of said lifting arm in a further vertical plane.

9. The device of claim 8 wherein said driving pin includes means at each end thereof for coupling to said rotatable shaft means, said auxiliary load arm including a further driving arm coupled to said shaft and having plural mounting means on opposite surfaces thereof, whereby said loading device may be operated from either side of said vehicle.

References Cited in the file of this patent

UNITED STATES PATENTS

| 1,592,743 | Osborn | July 13, 1926 |
| 2,359,287 | Bouffard | Oct. 3, 1944 |
| 2,496,388 | Gilbey | Feb. 7, 1950 |
| 2,502,108 | Taylor | Mar. 28, 1950 |
| 2,525,735 | Symons | Oct. 10, 1950 |

FOREIGN PATENTS

| 97,891 | Sweden | Jan. 23, 1940 |
| 110,481 | Sweden | Apr. 25, 1944 |